United States Patent [19]

Kanai et al.

[11] Patent Number: 4,722,996

[45] Date of Patent: Feb. 2, 1988

[54] UNDER-HOOD MATERIAL FOR MOTORCARS COMPRISING POLYAMIDE RESIN HAVING HYDROCARBON END GROUPS

[75] Inventors: Hideo Kanai; Yukinobu Murakami, both of Kitakyushu; Norimichi Koga, Mizumaki, all of Japan

[73] Assignee: Mitsubishi Chemical Industries Limited, Tokyo, Japan

[21] Appl. No.: 849,857

[22] Filed: Apr. 9, 1986

Related U.S. Application Data

[63] Continuation-in-part of Ser. No. 815,506, Jan. 2, 1986, Pat. No. 4,684,713.

[30] Foreign Application Priority Data

Jan. 14, 1985 [JP] Japan ................................... 60-4557
Apr. 15, 1985 [JP] Japan ................................. 60-79791

[51] Int. Cl.$^4$ ............................................. C08G 69/02
[52] U.S. Cl. ................................... 528/315; 525/420; 528/318; 528/336
[58] Field of Search ...................... 528/315, 318, 336; 525/420

[56] References Cited

U.S. PATENT DOCUMENTS

| | | | |
|---|---|---|---|
| 3,819,758 | 6/1974 | Cleary | 528/336 |
| 4,366,306 | 12/1982 | Smith | 528/315 |
| 4,507,462 | 3/1985 | Stille | 525/420 |

FOREIGN PATENT DOCUMENTS 2134123 8/1984 United Kingdom .

*Primary Examiner*—Harold D. Anderson
*Attorney, Agent, or Firm*—Oblon, Fisher, Spivak, McClelland & Maier

[57] ABSTRACT

Disclosed herein is an under-hood material for motorcars, prepared by molding a polymide resin comprising a caproamide component and/or a hexamethylene adipamide component as the major component thereof and having hydrocarbon groups of 6 to 22 carbon atoms as the end groups thereof, wherein (a) the number of the hydrocarbon groups is 5 to 100% of the total number of the end groups of the polyamide and (b) a relative viscosity of the polyamide is 2 to 6.

10 Claims, No Drawings

UNDER-HOOD MATERIAL FOR MOTORCARS COMPRISING POLYAMIDE RESIN HAVING HYDROCARBON END GROUPS

CROSS-REFERENCE TO RELATED APPLICATION

The present application is a continuation-in-part of application U.S. Ser. No. 815,506 filed Jan. 2, 1986 now U.S. Pat. No. 4,684,713.

BACKGROUND OF THE INVENTION

The present invention relates to an under-hood material for motorcars, prepared by molding a polyamide resin comprising a caproamide component and/or a hexamethylene adipamide component as the major component thereof and having hydrocarbon groups of 6 to 22 carbon atoms as end groups thereof, wherein (a) the number of the hydrocarbon groups is 5 to 100% of the total number of the end groups of the polyamide and (b) a relative viscosity of the polyamide is 2 to 6.

The under-hood material comprising the polyamide resin according to the present invention has a favorable resistance to the anti-freezing agent for pavements mainly composed of a metal halide such as calcium chloride, zinc chloride, etc. and also is excellent in rigidity and heat-resistance.

Recently, a tendency of changing metallic materials into plastic materials has been conspicuous in motorcar industry for the purposes of reducing the weight of motorcars for improving the ratio of the fuel consumption, of preventing rusts and of insulating sounds. Of the plastic materials, since polyamide resins have excellent characteristics such as heat-resistance, oil-resistance, moldability, toughness, etc., its application to the under-hood parts of motorcars including various functional parts, for instance, parts around the engine such as cooling fun, radiator, top and base of a tank, cylinder-head cover, oil pan, timing-belt pulley, etc., gears, valves, piping for brake, fuel tube, parts for fuel system such as fuel strainer, fuel filter, gasoline tank, etc., parts of exhaust gas system such as canister, etc. and parts of electrical system such as wire harness, connector, bands for assembling electric wires, etc. has attracted attentions.

However, since the polyamides relatively used well in general, such as nylon-6 and nylon-66 which have a relatively high concentration of amide groups, substantially have a strong affinity to inorganic metal salts such as calcium chloride, zinc chloride, etc., there is a large defect that the under-hood parts of motorcars made of these polyamides are cracked within a short period of use due to the erosion by a metal salt such as calcium chloride, magnesium chloride, zinc chloride, etc.

Generally, on the roads in cold districts, in winter an anti-freezing agent mainly composed of calcium chloride, magnesium chloride, etc. is sprinkled in a large amount, and in the case where these inorganic metal salts adhere to the under-hood parts of motorcars in an atmosphere at a high temperature, the parts are caused to be cracked and accordingly, there are many dangerous cases of causing motorcar accidents according to the erosion of the under-hood parts.

Therefore, the spread of the use of the under-hood parts made of nylon-6 and nylon-66 for motorcars has been limited because of the insufficient resistance thereof against the anti-freezing agent for pavement in spite of the excellent toughness and heat-resistance, and the low price thereof.

Accordingly at present, for spreading the use of the under-hood parts made of a lower polyamide resin such as nylon-6 and nylon-66 the offer of a material of lower polyamides which has a resistance to metal halides (a resistance to the anti-freezing agent for pavements) equivalent to or higher than that of nylon-11, nylon-12, etc. and is low in price is desired.

As a result of the present inventors' studies, it has been found that a polyamide resin having a relatively high concentration of the amide groups such as nylon-6, nylon-66, etc. and having hydrocarbon groups of 6 to 22 carbon atoms as the end groups thereof in number of larger than 5% of the total number of the end groups is high in the resistance to metal halides and is useful as the material for the under-hood parts of motorcars, and based on this finding, the present invention has been attained.

SUMMARY OF THE INVENTION

In an aspect of the present invention, there is provided an under-hood material for motorcars, prepared by molding a polyamide resin comprising a caproamide component and/or a hexamethylene adipamide component as the major component thereof and having hydrocarbon groups of 6 to 22 carbon atoms as the end groups thereof, wherein (a) the number of the hydrocarbon groups is 5 to 100% of the total number of the end groups of the polyamide and (b) a relative viscosity of the polyamide is from 2 to 6.

DETAILED DESCRIPTION OF THE INVENTION

The polyamide resin used according to the present invention is as the major component the polyamide which is naturally poor in the resistance to metal halides and is represented by polycaproamide (nylon-6), polyhexamethylene adipamide (nylon-66) and those copolymerized polyamide, mixed polyamide, etc. having nylon-6 and/or nylon-66.

As the hydrocarbon group of 6 to 22 carbon atoms of the polyamide of the present invention, an aliphatic hydrocarbon group such as hexyl group, heptyl group, octyl group, 2-ethylhexyl group, nonyl group, decyl group, undecyl group, dodecyl group, tridecyl group, tetradecyl group, tetradecylene group, pentadecyl group, hexadecyl group, heptadecyl group, octadecyl group, octadecylene group, eicosyl group and docosyl group, a cycloaliphatic hydrocarbon group such as cyclohexyl group, methylcyclohexyl group and cyclohexylmethyl group and an aromatic hydrocarbon group such as phenyl group, toluyl group, benzyl group and beta-phenylethyl group may be exemplified.

The above-mentioned hydrocarbon group is introduced into the product in the time of synthesizing the polyamide by using the carboxylic acid and/or the amine.

As the end group of the polyamide of the present invention, amino groups and/or the carboxyl groups derived from the raw material of the polyamide other than the hydrocarbon groups are presented.

The hydrocarbon end groups of the polyamide of the present invention are measured by gas chromatography after hydrolyzing the polyamide with hydrochloric acid. The amino end groups of the polyamide of the present invention are measured by dissolving the polyamide in phenol and titrating the amino groups with an aqueous 0.05N hydrochloric acid solution. The carboxylic end groups of the polyamide of the present invention are measured by dissolving the polyamine in benzyl alcohol and titrating the carboxylic acid with an aqueous 0.1N sodium hydroxide solution.

The number of total end groups of the polyamide of the present invention is the sum of each number of the hydrocarbon groups, amino groups and/or carboxyl groups.

In the present invention, the number of the hydrocarbon groups is 5 to 100% of the total number of the end groups of the polyamide. The polyamide having the hydrocarbon groups of below 5% to the total number of the end groups does not exhibit the sufficient resistance to metal halides and is not favorable.

Although it is favorable to have the number of the hydrocarbon groups of the polyamide of the present invention in the vicinity of 100% of the total number of the end groups of the polyamide from the view point of the resistance to metal halides, since it is not easy to produce such a polyamide, it is preferable to have the percentage of the hydrocarbon groups of 10 to 95%, more preferably, 10 to 90%.

Concerning the polymerization degree of the polyamide according to the present invention, it can be optionally selected within the range of "relative viscosity" measured in 98% sulfuric acid at a concentration of 1% by weight and at a temperature of 25° C. following Japanese Industrial Standards (JIS) K 6810, of 2 to 6, preferably 2.3 to 5. In the case of using the polyamide of the lower relative viscosity, the improvement of the anti-fatigue property of the polyamide is not expectable, and on the other hand, in the case of using the polyamide of the higher viscosity, the melt-fluidity of the polyamide is reduced and accordingly, these two cases are not favorable.

For the production of the polyamide resin according to the present invention, the raw material for producing a polyamide are subjected to polycondensation in the presence of a monoamine of 6 to 22 carbon atoms and/or a monocarboxylic acid of 7 to 23 carbon atoms. In the case of carrying out the polycondensation, a diamine of 2 to 22 carbon atoms may be coexisted with the monocarboxylic acid or a dicarboxylic acid of 3 to 24 carbon atoms may be coexisted with the monoamine.

As the monocarboxylic acid of 7 to 23 carbon atoms, an aliphatic monocarboxylic acid such as enanthic acid, caprylic acid, capric acid, pelargonic acid, undecanoic acid, lauric acid, tridecanoic acid, myristic acid, myristoleinic acid, palmitic acid, stearic acid, oleic acid, linolic acid, arachic acid and behenic acid, a cycloaliphatic monocarboxylic acid such as cyclohexanecarboxylic acid and methylcyclohexanecarboxylic acid, an aromatic monocarboxylic acid such as benzoic acid, toluic acid, ethylbenzoic acid and phenylacetic acid may be mentioned. In addition, a derivative of the monocarboxylic acid, which can play the same role as that of the monocarboxylic acid during the reaction for producing the polyamide of the present invention, for instance, acid anhydride, ester, amide of the monocarboxylic acid can be used instead of the monocarboxylic acid.

As the monoamine of 6 to 22 carbon atoms, an aliphatic monoamine such as hexylamine, heptylamine, octylamine, 2-ethyl-hexylamine, nonylamine, decylamine, undecylamine, dodecylamine, tridecylamine, tetradecylamine, pentadecylamine, hexadecylamine, octadecylamine, octadecyleneamine, eicosylamine and docosylamine, an alicyclic monoamine such as cyclohexylamine and methylcyclohexylamine and an aromatic monoamine such as benzylamine and β-phenylethylamine may be mentioned.

In addition, as a diamine of 2 to 22 carbon atoms, an aliphatic diamine such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, hexadecamethylenediamine, octadecamethylenediamine and 2,2,4 (or 2,4,4)-trimethylhexamethylenediamine, an alicyclic diamine such as cyclohexanediamine, methylcyclohexanediamine and bis-(4,4'-aminocyclohexyl)methane and an aromatic diamine such as xylylenediamine may be mentioned.

Further, as a dicarboxylic acid of 3 to 24 carbon atoms, an aliphatic dicarboxylic acid such as malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, hexadecanedioic acid, hexadecenedioic acid, octadecanedioic acid, octadecenedioic acid, eicosanedioic acid, eicosenedioic acid, docosanedioic acid and 2,2,4-trimethyladipic acid, an alicyclic dicarboxylic acid such as 1,4-cyclohexanedicarboxylic acid and an aromatic dicarboxylic acid such as terephthalic acid, isophthalic acid, phthalic acid and xylylenedicarboxylic acid may be mentioned.

In the reaction for producing the polyamide resin according to the present invention, the reaction may be initiated in accordance with the ordinary method while using the above-mentioned raw materials and following a known method (refer to USP 2241322, USP 2241323 and USP 2071250), and the carboxylic acid and/or amine may be added to the reaction system at an optional stage of the reaction from the time of initiation of the polycondensation to the initiation of the reaction under a reduced pressure. The carboxylic acid and the amine may be added at the same time or separately.

The amounts of the carboxylic acid and/or amine may be 0.4 to 20 meq/mol (3.5 to 170 µeq/g), preferably 0.5 to 15 meq/mol (4.5 to 130 µeq/g), respectively as the amount of the carboxyl group and/or the amino group thereof. In the case where the amount of the carboxylic acid and/or the amine is too small, it is impossible to produce the polyamide resin which exhibits the effect of the present invention. On the other hand, in the case where the amount is too large, it is difficult to produce the polyamide of a high viscosity and unfavorable influence appear on the physical property of the polyamide.

The under-hood material for motorcars according to the present invention is produced by subjecting the polyamide resin to a known molding method generally applied to thermoplastic resin such as injection molding, extrusion molding, blow molding, vacuum molding, etc. In addition, other components, for instance, pigments, dyestuffs, a heat-resisting agent, an anti-oxidant, a weather-proof agent, lubricant, crystal seed agent, charge-preventing agent, plasticizers, the other polymers, etc. may be added to the polyamide resin, provided that the addition does not impair the moldability and physical properties thereof.

As has been described, the molded articles produced by molding the polyamide resin according to the present invention has a remarkably improved resistance to metal halides and at the same time, has the excellent mechanical properties such as impact strength and bending strength equivalent to those of the ordinary nylon-6 and accordingly the polyamide resin according to the present invention is extremely useful as the underhood material for motorcars.

The present invention will be explained more in detail while referring to the following non-limitative Examples and Comparative Examples.

EXAMPLES 1 to 4

Into a 200-liter autoclave, 60 kg of ε-caprolactam, 1.2 kg of water and amounts of stearic acid and octadecylamine shown in Table 1 were introduced, and after tightly closing the autoclave and substituting the vapour phase of the autoclave by gaseous nitrogen, the thus introduced materials were heated to 250° C. After carrying out the reaction for 2 hours under agitation and its own pressure, the pressure of the autoclave was slowly reduced to the value shown in Table 1 and the reaction was continued for 2 hours under the reduced pressure.

Thereafter, gaseous nitrogen was introduced into the autoclave to return the pressure of the autoclave to ordinary level and after stopping the agitation, the reaction mixture was taken out from the autoclave and pelletized. After extracting and removing the unreacted monomer with boiling water, the thus treated pellets were dried.

Specimens for physical property test were prepared by using the thus obtained pellets after subjecting thereof to a 3.6 oz injection-molding machine (made by TOSHIBA KIKAI CO., LTD. Model: IS-75S) at a molding temperature of 260° C. and a metal-mold temperature of 80° C.

In the physical property test shown in Table 1, the Izod impact level and the bending property were measured according to ASTM D256 and ASTM D790, respectively.

Concerning the resistance of the polyamide resin to calcium chloride, tests were carried out by using the dumbbell-shaped specimen (Type 1 of ASTM D 638) after notching 4 mm in depth in the both parallel sides respectively and after following the method of ASTM D2552 while immersing the specimen in a bath containing an aqueous 50% solution of calcium chloride at 50° C. and applying a constant stress of 80 kg/cm², the rupture of the specimen was occurred. The time from the immersion to the rupture was taken as the index corresponding to the resistance of the specimen to calcium chloride. The data are shown also in Table 1.

The relative viscosity of the thus prepared polyamide resin was measured according to Japanese Industrial Standards (JIS) K 6810 in 98% sulfuric acid at a concentration of the resin of 1% and at a temperature of 25° C.

COMPARATIVE EXAMPLE 1

In the same manner as in Example 1 except for using acetic acid in an amount of 10 μeq/g instead of using stearic acid and octadecylamine, a polyamide resin was prepared. The results are also shown in Table 1.

TABLE 1

|  | Example 1 | Example 2 | Example 3 | Example 4 | Comparative Example 1 |
|---|---|---|---|---|---|
| Stearic acid (μeq/g) | 9 | 24 | 50 | 37 | *1 |
| Octadecylamine (μeq/g) | 10 | 24 | 50 | 37 |  |
| Final pressure in polycondensation (Torr) | 500 | 200 | 10 | 30 | 500 |
| Polyamide |  |  |  |  |  |
| Relative viscosity | 2.75 | 3.10 | 2.60 | 3.03 | 2.90 |
| NH₂ group at end (μeq/g) | 44 | 19 | 4 | 7 | 37 |
| COOH group at end (μeq/g) | 43 | 19 | 5 | 8 | 47 |
| Rate of termination (%)*² | 18 | 56 | 92 | 83 | 0 |
| Resistance to CaCl₂ (hour) | 780 | >1000 | >1000 | >1000 | 3.8 |
| Izod impact level (kg · cm/cm) | 4.5 | 4.5 | 4.5 | 4.5 | 4.5 |
| Modulus of bending (kg/cm²) | 27500 | 27500 | 27400 | 27000 | 27500 |
| Bending strength (kg/cm²) | 1080 | 1050 | 1050 | 1000 | 1050 |

Notes:
*¹Acetic acid 10 μeq/g
*²Percentage of the number of the hydrocarbon groups of 6 to 22 carbon atoms to the total number of the end groups of the polyamide.

EXAMPLE 5

Into an autoclave of a capacity of 200 liters, 60 kg of ε-caprolactam, 1.2 kg of water, 108 g (1.8 mol %) of acetic acid and 534 g (1.96 mol %) of octadecylamine were introduced, and the thus introduced materials were treated in the same manner as in Example 1. The results are shown in Table 2 below.

TABLE 2

| Amount of acetic acid (μeq/g) | 30 |
|---|---|
| Amount of octadecylamine (μeq/g) | 33 |
| Final pressure of polycondensation (Torr) | 200 |
| Polyamide |  |
| Relative viscosity | 2.89 |
| NH₂ group at end (μeq/g) | 21 |
| COOH group at end (μeq/g) | 19 |
| Rate of termination (%) | 32 |
| Resistance to CaCl₂ (hours) | >1000 |
| Izod impact level (kg · cm/cm) | 5.0 |
| Modulus of bending (kg/cm²) | 27500 |
| Bending strength (kg/cm²) | 1050 |

EXAMPLES 6 to 9

After introducing, into a 200-liter autoclave, 60 kg of ε-caprolactam, 1.2 kg of water and both carboxylic acid and amine shown in Table 3, the autoclave was tightly closed under an atmosphere of gaseous nitrogen, and was heated to 260° C. to carry out the reaction for 2 hours under a pressure while stirring the content of the autoclave. Thereafter, the pressure of the autoclave was decreased to the value shown in Table 3, and the reaction was further continued for 2 hours under the reduced pressure.

After introducing gaseous nitrogen into the autoclave to bring the inner pressure of the autoclave to ordinary level, the stirring was stopped, and the reaction product was taken out in a strand state and pelletized. The pelletized product was tested with boiling water to extract and remove the unreacted monomer therefrom, and the thus treated product was dried.

In the same manner as in Example 1, physical and chemical properties of the thus obtained pellets of polyamide resin were measured, the results being shown in Table 3.

TABLE 3

|  | Example | | | |
|---|---|---|---|---|
|  | 6 | 7 | 8 | 9 |
| Kind of carboxylic acid | stearic acid | caproic acid | stearic acid | adipic acid |
| Amount of carboxylic acid ($\mu$eq/g) | 53 | 32 | 82 | 83 |
| Kind of amine | octadecyl-amide | dodecylamine | hexamethyl-enediamine | octadecyl-amine |
| Amount of amine ($\mu$eq/g) | 55 | 35 | 82 | 83 |
| Final pressure in poly-condensation (Torr) | 200 | 180 | 300 | 120 |
| Polyamide |  |  |  |  |
| Relative viscosity | 2.30 | 2.90 | 2.35 | 2.75 |
| NH$_2$ group at end ($\mu$eq/g) | 21 | 17 | 30 | 13 |
| COOH group at end ($\mu$eq/g) | 20 | 16 | 30 | 14 |
| Rate of termination (%) | 72 | 65 | 58 | 76 |
| Resistance to CaCl$_2$ (hour) | >1000 | >1000 | >1000 | >1000 |
| Izod impact level (kg · cm/cm) | 4.0 | 4.5 | 4.5 | 4.5 |
| Modulus of bending (kg/cm$^2$) | 27500 | 27000 | 27000 | 27300 |
| Bending strength (kg/cm$^2$) | 1000 | 1070 | 1000 | 1050 |

What is claimed is:

1. An under-hood part for motorcars, prepared by molding a polyamide resin comprising as the major component thereof at least one component selected from the group consisting of a caproamide component and a hexamethylene adipamide component and having hydrocarbon groups of 6 to 22 carbon atoms at the end groups thereof, wherein (a) the number of the hydrocarbon groups is 5 to 100% of the total number of the end groups of said polyamide and (b) a relative viscosity measured in 98% sulfuric acid at a concentration of 1% by weight and at a temperature of 25° C. is 2 to 6.

2. An under-hood part according to claim 1, wherein the number of said hydrocarbon groups is 10 to 95% of the total number of the end groups of said polyamide.

3. An under-hood part according to claim 1, wherein the ralative viscosity of said polyamide is 2.3 to 5.

4. An under-hood part according to claim 1, wherein said polyamide is produced by subjecting the starting material for producing said polyamide to polycondensation in the presence of at least one member selected from the group consisting of a monocarboxylic acid of 7 to 23 carbon atoms and a monoamine of 6 to 22 carbon atoms.

5. An under-hood part according to claim 1, wherein said polyamide is produced by subjecting the starting material for producing said polyamide to polycondensation in the presence of a monocarboxylic acid of 7 to 23 carbon atoms, a monoamine of 6 to 22 carbon atoms, a diamine of 2 to 22 carbon atoms and a dicarboxylic acid of 3 to 24 carbon atoms wherein said polyamide additionally contains units derived from said diamine and said dicarboxylic acid.

6. An under-hood part according to claim 1, wherein said under-hood part for motorcars is a part around the engine, a gear, a valve, piping for brakes, a fuel tube, a part for the fuel system, part of the exhaust gas system or part of the electrical system.

7. An under-hood part according to claim 6, wherein said part around the engine is cooling fan, radiator, top and base of a tank, cylinder-head cover, oil pan or timing-belt pulley.

8. An under-hood part according to claim 6, wherein said part for the fuel system is a fuel strainer, fuel filter or gasoline tank.

9. An under-hood part according to claim 6, wherein said part of the exhaust gas system is a canister.

10. An under-hood according to claim 6, wherein said part of the electrical system is wire harness, connector or band for assembling electric wire.

* * * * *

UNITED STATES PATENT AND TRADEMARK OFFICE
CERTIFICATE OF CORRECTION

PATENT NO. : 4,722,996

DATED : Feb. 2, 1988

INVENTOR(S) : HIDEO KANAI ET AL

It is certified that error appears in the above-identified patent and that said Letters Patent is hereby corrected as shown below:

On the front page of the patent, in item [45] add an * before the date "Feb. 2, 1988" to --*Feb. 2, 1988--.

Below item [22] add:

--[73*] Notice: The portion of the term of this patent subsequent to Aug. 4, 2004 has been disclaimed--.

Signed and Sealed this

Seventh Day of November, 1989

Attest:

JEFFREY M. SAMUELS

Attesting Officer

Acting Commissioner of Patents and Trademarks